(12) United States Patent
Bulle

(10) Patent No.: US 9,304,505 B2
(45) Date of Patent: Apr. 5, 2016

(54) METHOD OF FORMING A CUT-PATH

(71) Applicant: Jason Bulle, Rye, CO (US)

(72) Inventor: Jason Bulle, Rye, CO (US)

(73) Assignee: NCT-146 LLC, Chandler, AZ (US)

( * ) Notice: Subject to any disclaimer, the term of this patent is extended or adjusted under 35 U.S.C. 154(b) by 714 days.

(21) Appl. No.: 13/748,210

(22) Filed: Jan. 23, 2013

(65) Prior Publication Data

US 2013/0197689 A1    Aug. 1, 2013

Related U.S. Application Data

(60) Provisional application No. 61/589,516, filed on Jan. 23, 2012.

(51) Int. Cl.
*G05B 19/37* (2006.01)
*G05B 19/408* (2006.01)

(52) U.S. Cl.
CPC .............. *G05B 19/37* (2013.01); *G05B 19/408* (2013.01)

(58) Field of Classification Search
USPC ................................................. 83/32, 49, 56
See application file for complete search history.

(56) References Cited

U.S. PATENT DOCUMENTS

| 5,847,956 A * | 12/1998 | Bronfeld | G06T 17/10 345/420 |
| 8,085,266 B2 * | 12/2011 | Carbonera | G06T 17/10 345/420 |
| 2002/0092389 A1 * | 7/2002 | Feldman | B26D 5/00 83/49 |
| 2008/0185368 A1 * | 8/2008 | Fagan | B23K 7/001 219/124.21 |

\* cited by examiner

*Primary Examiner* — Robert Fennema
*Assistant Examiner* — Md N Mia
(74) *Attorney, Agent, or Firm* — Robert A. Parsons; Michael W. Goltry; Parsons & Goltry

(57) ABSTRACT

A method of forming a cut path that includes the steps of selecting a first image line and a second closed image line surrounding an enclosed area, Overlying the second closed image line on the first image line and identifying a pair of intersections between the first image line and the second closed image line, and making a determination to turn one of right or left at both of the intersections of the pair of intersections to add portions of the second closed image line lying between the intersections with portions of the first image line to form a cut-path.

23 Claims, 16 Drawing Sheets

METHOD OF FORMING A CUT-PATH

CROSS-REFERENCE TO RELATED APPLICATIONS

This application claims the benefit of U.S. Provisional Patent Application No. 61/589,516, filed 23 Jan. 2012.

FIELD OF THE INVENTION

This invention relates to cutting device control. More particularly, the present invention relates to cutting device control using merging paths.

BACKGROUND OF THE INVENTION

It is well known in the industry how to control cutting tools along a continuous given path. However whenever additional paths are included the cutting can become very complicated. Also, in many instances the cutting tools are directed along the same approximate path more than one time because of overlapping lines in the paths. Further, in many cutting applications the thickness of the cut (kerf) reduces or expands the size of the final cut item so that it does not match the pattern. In many complicated patterns the thickness of the cut may be greater than the thickness of portions of the pattern, resulting in over-cutting or a failure to successfully cut narrow areas. In many applications (e.g. cutting out letters and numbers) portions of the pattern may be cut completely around and the center will simply fall out.

It would be highly advantageous, therefore, to remedy the foregoing and other deficiencies inherent in the prior art.

Accordingly, it is an object of the present invention to provide a new and improved method of forming a cut-path for cutting tools.

It is another object of the present invention to provide a new and improved method of forming a cut-path for cutting tools that allows two or more images to be integrated or merged into one merging cut-path.

It is another object of the present invention to provide a new and improved method of forming a cut-path for cutting tools that eliminates or substantially reduces the effect of the cut thickness on a final pattern.

It is another object of the present invention to provide a new and improved method of forming a cut-path for cutting tools that reduces under-cutting, over-cutting, and other related malfunctions along near-parallel cut-paths and in narrow areas.

It is another object of the present invention to provide a new and improved method of forming a cut-path for cutting tools that allows merging images to reduce fallout of portions of the cut-path.

SUMMARY OF THE INVENTION

Briefly, the desired objects of the instant invention are achieved in accordance with a preferred method of forming a cut path that includes the steps of selecting a first image line and a second closed image line surrounding an enclosed area. The method includes a step of overlying the second closed image line on the first image line and identifying intersections between the first image line and the second closed image line. Also, the method includes a step of adding portions of the second closed image line lying between the intersections with portions of the first image line to form a cut-path including a continuous combination of at least a portion of the second closed image line and portions of the first image line.

The desired objects of the instant invention are further realized in accordance with a specific method of forming a cut path that includes the steps of selecting a first image line and a second closed image line surrounding an enclosed area. The method includes the step of overlying the second closed image line on the first image line and identifying a pair of intersections between the first image line and the second closed image line. Also, the method includes the step of making a determination to turn one of right or left at both of the intersections of the pair of intersections to add portions of the second closed image line lying between the intersections with portions of the first image line to form a cut-path.

The desired objects of the instant invention are further realized in accordance with a specific method of forming a cut path that includes the steps of selecting a first image line and a second closed image line surrounding an enclosed area. The method includes the step of overlying the second closed image line on the first image line and identifying a pair of intersections between the first image line and the second closed image line. The method includes the steps of providing a program writing the images into a cut-path and instructing the program to follow the first image line in a continuous direction and to turn one of right or left at both of the intersections of the pair of intersections to add portions of the second closed image line lying between the intersections with portions of the first image line to form the cut-path.

BRIEF DESCRIPTION OF THE DRAWINGS

The foregoing and further and more specific objects and advantages of the instant invention will become readily apparent to those skilled in the art from the following detailed description of a preferred embodiment thereof taken in conjunction with the drawings, in which.

DETAILED DESCRIPTION OF A PREFERRED EMBODIMENT

Figure 1:
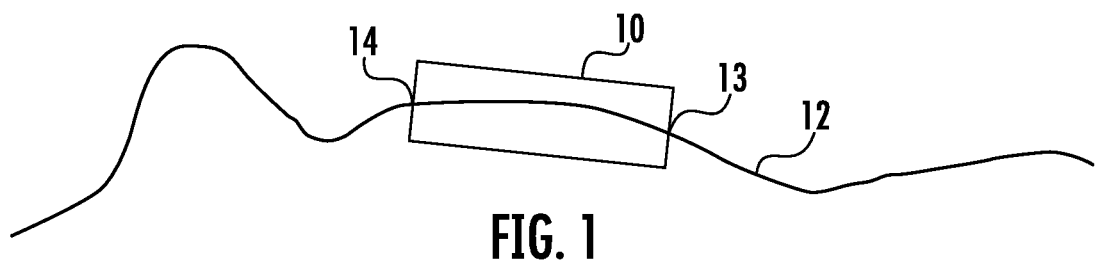
FIG. 1 illustrates two patterns to be merged.
Figure 2:
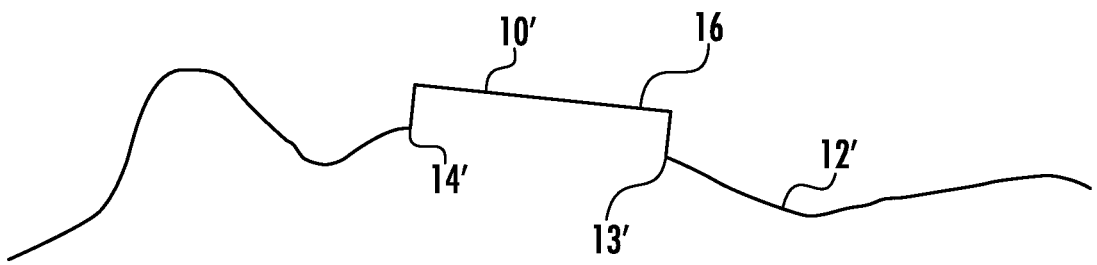
FIG. 2 illustrates the two patterns of FIG. 1 merged into a single continuous pattern in accordance with the present invention.

Turning now to the drawings in which like reference characters indicate corresponding elements throughout the several views, attention is directed to FIGS. 1 and 2 which illustrate overlapping images and a merged cut-path, respectively, according to the present invention. A new method for merging images is disclosed. Understand that images in the present method are vectors composed of many interconnected line segments. Images are stored as a series of X and Y coordinates, according to the Cartesian coordinate system. The new image merging algorithm serves as the mathematical foundation for many of the new features in the present invention.

For example, turning to FIG. 1, two images are illustrated including a closed image line 10 and an image line 12, respectively. The image including image line 10 is a closed path or polygon, meaning that all its vectors connect end to end so that they enclose an area that can be thought of as a solid or region. The image including image line 12 can either be an open or closed image but only image line 12 needs to be shown for purposes of this description. Closed image line 10 is typically a temporary, construction image that is used to alter the shape of the final cut-path including image line 12.

The operation is done by first locating all of the intersections between the two images. The example illustrated by FIG. 1 includes two intersections 13 and 14 between closed image line 10 and image line 12. Assuming the program writing the images into a cut-path travels along first image line 12 from right to left and is instructed to turn right or clockwise or to turn left or counterclockwise at both intersections 13 and 14. Hence the new method reroutes image line 12 around closed image line 10 either to the right side or the left side (in FIG. 1) of image line 12. Thus, when the program is instructed to turn right at each intersection 13 and 14 the resulting cut-path is illustrated by FIG. 2 where the lower portion of closed image 10 is removed. Conversely, when the program is instructed to turn left at each intersection 13 and 14 the resulting cut-path will include the lower portion of closed image 10 and the upper portion will be removed.

Figure 3A:
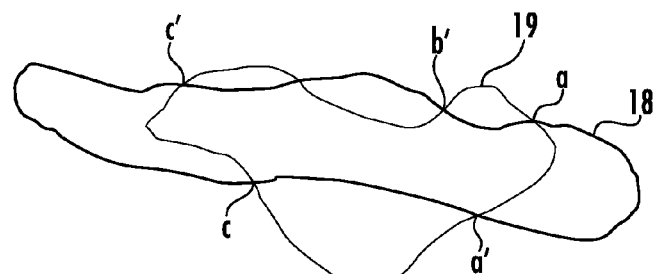
FIG. 3 includes FIG. 3A that illustrates two partially overlapping closed images, FIG. 3B in which the two images are added (merged) into a single merged cut-path in accordance with the present invention, and FIG. 3C in which the two images are subtracted (merged) to form non-overlapping cut-paths in accordance with the present invention.

The method works even in complex situations, such as illustrated in FIG. 3A, where a first closed image line 18 enters and exits the region of an overlying second closed image line 19 in multiple places. Thus in the example illustrated in FIG. 3A, there are six intersections between closed image line 18 and closed image line 19. The intersections can be divided into intersections in which first closed image line 18 enters the enclosed area of second closed image line 19 and intersection in which first closed image line 18 exits the enclosed area of second closed image line 19. Thus, the six intersections can be divided into three pairs of entrance and exit intersections, a/a', b/b', and c/c'.

Figure 3B:
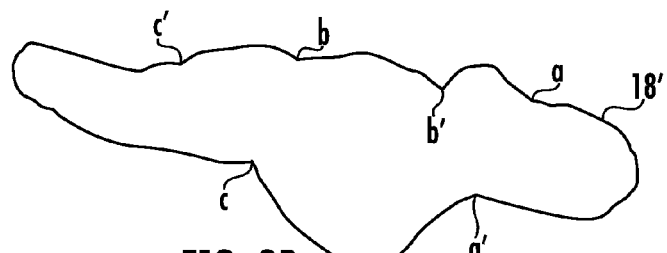
Figure 3C:
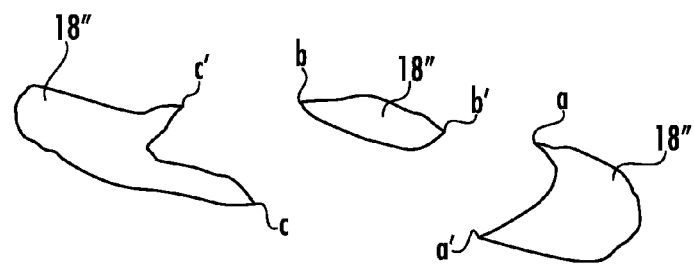

For example assuming the program writing the images in FIG. 3A into a merged cut-path moves along first image path 18 in a counterclockwise direction, it can be seen that closed image line 18 enters the area enclosed by closed image line 19 at intersections a, b, and c and exits the area at intersections a', b', and c'. When the program is instructed to turn right at each intersection stretches of closed image line 18 that are within the enclosed area of closed image line 19 between the intersections are cut and removed from a final cut-path 18' and stretches of closed image line 19 between the intersections that are outside the enclosed area of closed image line 18 are added to final cut-path 18', as illustrated in FIG. 3B. When the program is instructed to turn left at each intersection stretches of closed image line 19 that are within the enclosed area of closed image line 18 between the intersection pairs are added to closed image line 18 and stretches of closed image lines 18 and 19 between adjacent intersections (in the direction of movement) are subtracted or removed to define final cut-paths 18", as illustrated in FIG. 3C.

Figure 4:
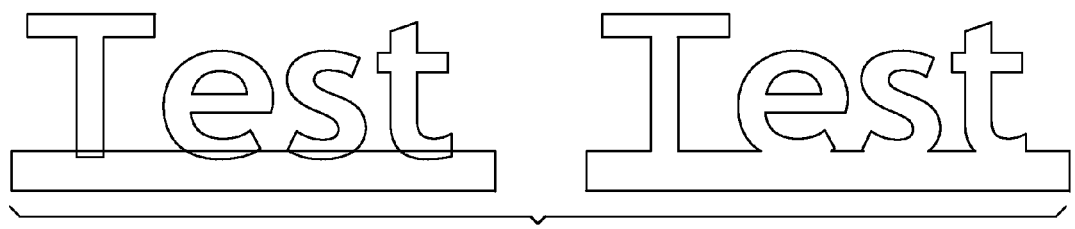
FIG. 4 illustrates several partially overlapping closed images and the several images added (merged) into a single continuous cut-path in accordance with the present invention.

Referring now to FIG. 4, two or more enclosed images can be combined to form a single cut-path using the merging images method. For example, the loose letters (TEST) are joined to the base automatically using this method. This feature simply uses the merging image method described above in a way that routes the final cut-path (left hand figure) around all other paths in the direction that adds the regions together. This feature is important because to cut this design out of a piece of metal, all the intersections need to be connected together correctly so that the design will cut out as one final shape.

Figure 5:
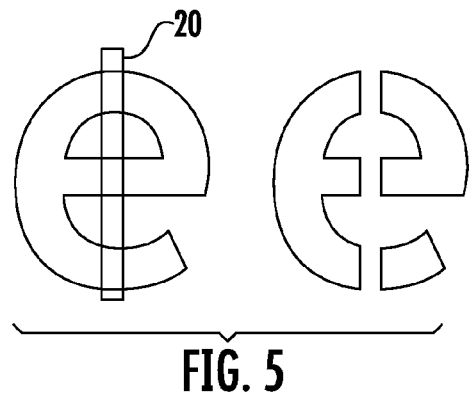
FIG. 5 illustrates a letter and stencil bar positioned in overlapping closed images and the closed images subtracted (merged) to form non-overlapping cut-paths (stencil letter) in accordance with the present invention.
Figure 6:
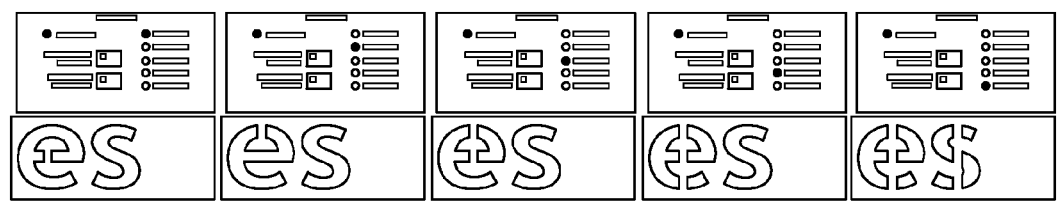
FIG. 6 illustrates a variety of different methods of combining letter and stencil bar images to eliminate fallout in a final cut-path, in accordance with the present invention.

Referring now to FIG. 5, stencil text can be formed using the merging image method described above. The method automatically stencils text that was not originally designed to be stenciled. This is done by creating stencil bars across letters and then cutting the region of the stencil bars from the letters as shown. The image merging method described is used for this operation; it subtracts the area of each stencil bar from the area of each letter (i.e. assuming the program writing the cut-path moves continuously counterclockwise around the letter, a left turn is instructed at each intersection). A closed image line 20 is shown for illustration purposes and is not actually visible to users of the method in the present software. Text is stenciled automatically as it is drawn. This makes letters so they can be cut out of metal or other material without any holes falling away. The software using the method provides 5 different modes of stenciling that controls how much of the letter is cut away by a stencil bar as shown in FIG. 6.

Figure 7:
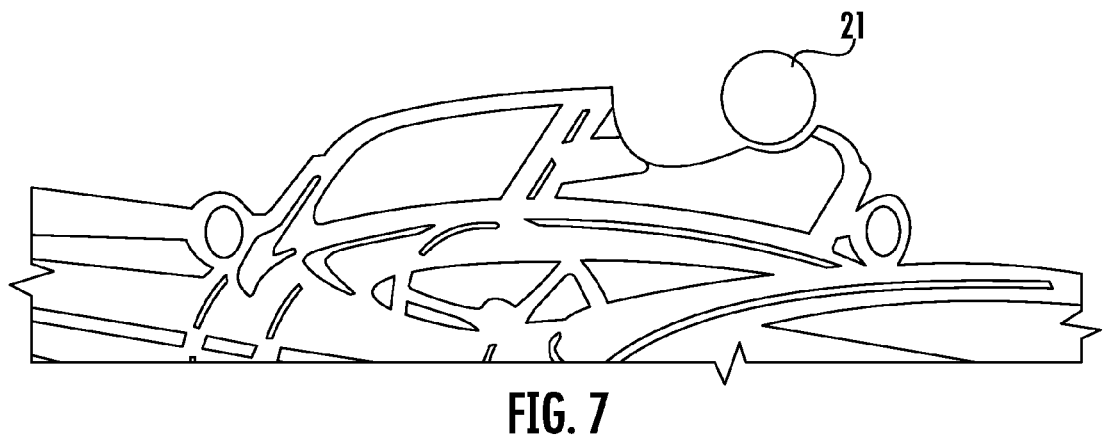
FIG. 7 illustrates the use of a closed image with the closed image subtraction process to form a brush reshaping tool.

Turning to FIG. 7, the merging image method can be used in the software to provide a brush tool that can reshape or erase paths. The brush tool appears on screen as a circle 21. In the normal mode (FIG. 7), the brush tool pushes paths around without cutting them. This allows a user to reshape paths by hand using a mouse. This is accomplished using the path merging method described. All the paths crossing the circle of the brush tool are rerouted around the edge of the circle (either to one side or the other, depending on which side is closer to the path). In another mode, the brush tool works like an eraser. It uses the same method, except that it does not route paths around the circle after it cuts them, i.e. only portions outside of the circle between intersections remain. In this mode, any part of a path falling inside of the brush circle is erased when the tool is used.

Figure 8:
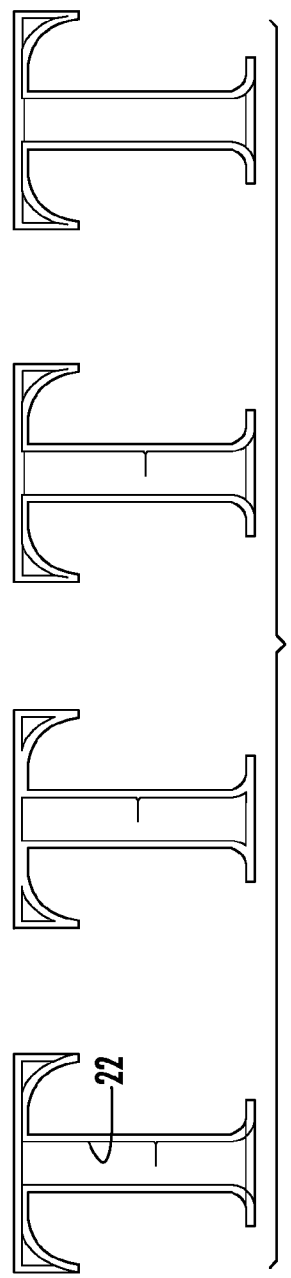
FIG. 8 illustrates several merging image techniques for more closely or accurately defining a continuous cut-path.

Referring now to FIGS. 8-13, a method of offset and cut-path conversion is described. Offsetting a cut-path is important for compensating for the kerf width of a cutter when cutting shapes out of metal with a torch or when cutting other materials with other cutting tools. If no kerf compensation is done, the piece cut will not be the same size as the piece drawn (because of the kerf width). It is known to automatically offset paths when creating cut-paths to make this compensation. However, problems occur in certain situations such as the following example shown in FIG. 8. FIG. 8 illustrates four different stages of how the process of creating an offset cut path that corrects for the kerf is improved in the software using the present method. The leftmost image shows how the conventional software would have converted the shape. Notice how cut path 22 overlaps itself when going into tight corners and narrow passages. While this may be a true mathematical offset of the original shape, it is not ideal for actually cutting the shape. The letter will still cut, but the resulting shape will not be as good as it could be because of excess material being cut away around these overlapped areas.

Figure 8A:
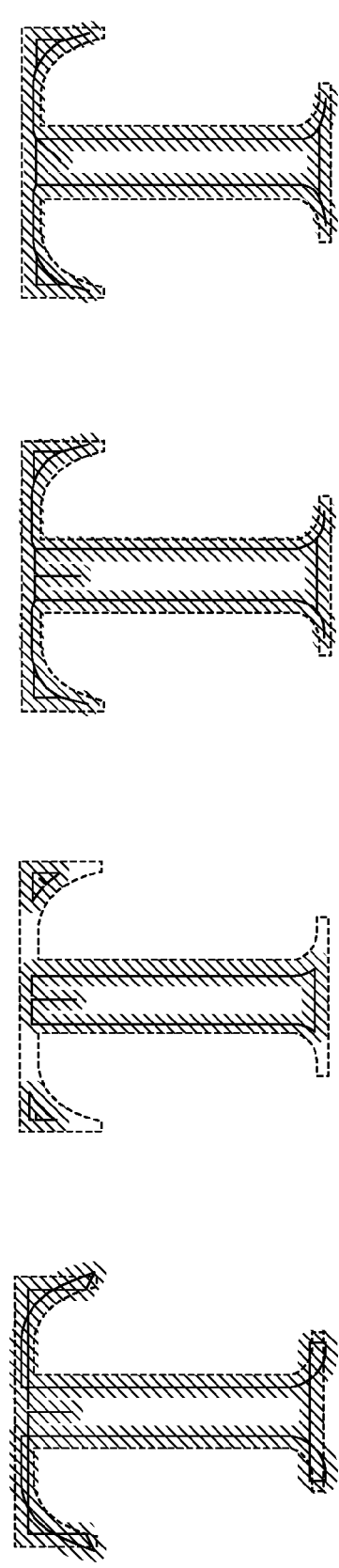
FIG. 8A illustrates images similar to those shown in FIG. 8 with modifications to the cut-paths.

Referring additionally to FIG. 8A some modifications to the cut-path are illustrated to more accurately cut out the specific letter shown. In the first image on the left-hand side, excessive material is shown being removed by the use of a simple offset of the geometry to be cut. The second image from the left shows that only pockets of material will be removed when no overcutting is included. The third image shows a good balance of undercutting and overcutting to achieve a close replica of the desired shape. The fourth image (far right image) shows the present method of locating the lead-in to reduce double cutting on a part of the shape. Notice that the lead-in in the final image is moved from the lead-in in the third image.

Figure 9:
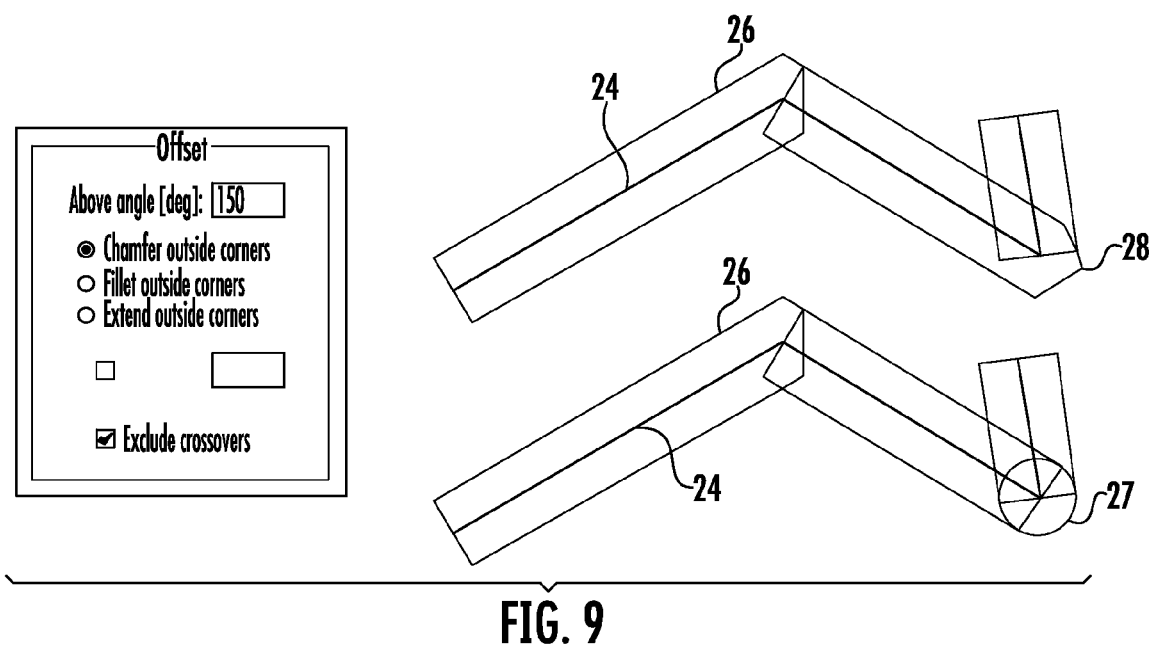
FIG. 9 illustrates several merging image techniques for merging images to chamfer or fillet outside corners of a continuous cut-path.

The second image from the left shows how the shape can be converted using the new image merging method described above. In this situation, the cut-path is offset using a series of regions, or rectangularly shaped overlying closed images, that are built around the basic image as shown in FIG. 9.

To offset a basic image line 24, rectangular polygons 26 are formed around or in overlying relationship with each continuously straight segment of basic image line 24. Each rectangle 26 is centered on a segment of basic image line 24 and has a width that is twice the selected or desired offset distance. The end of each rectangle 26 is extended as shown with an extra node to form an extended corner that is still along the image line 24. The option to either fillet or chamfer any outside corners that are sharper than an angular threshold when offsetting is also provided. When the fillet option is chosen, a circle image 27 is created at every sharp corner with radii equal to the offset distance. When the chamfer option is chosen, the rectangle before the corner has an additional node 28 that forms a symmetric chamfer off the sharp corner. The distance from the middle of the chamfer to the original corner equals the offset distance. These are temporary, construction polygons (closed images) that are created only long enough to offset the basic image line. The basic image line is then rerouted around all these polygons to the left or right side, depending on the offset direction, as described above in the new image merging method. As a result, the offset cut-path has no overlapping intersections. In some situations, multiple cut-paths may result from offsetting a single cut-path, as in the "T" example of FIG. 8.

Figure 10:
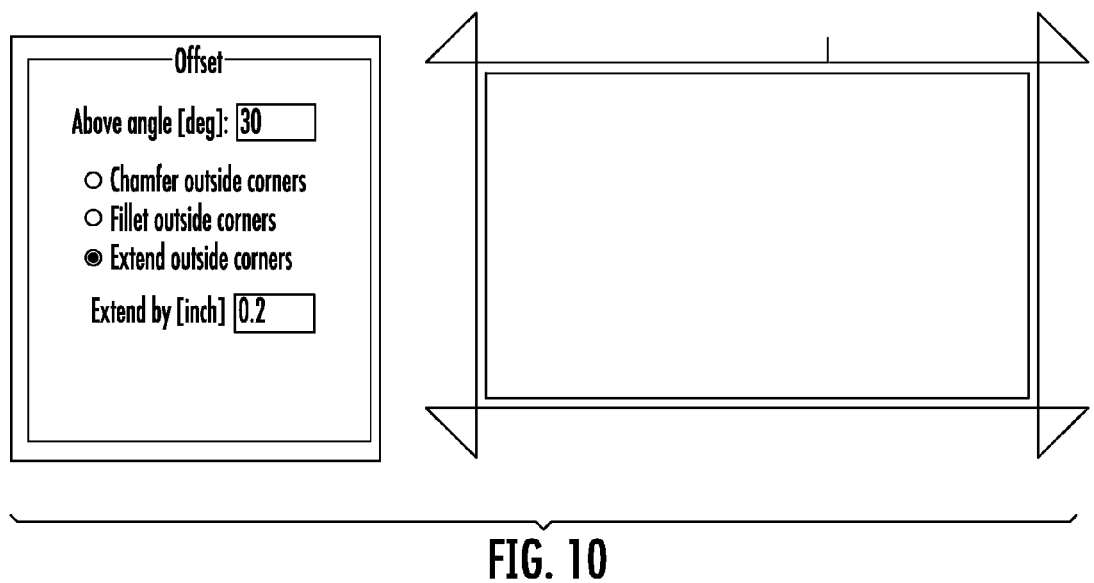
FIG. 10 illustrates a merging image technique for extending outside corners of a continuous cut-path and a cutting tool selector for the process.

Additionally, outside corners can be extended over the angular threshold when creating offset cut-paths, as shown in FIG. 10. The purpose of this is to have the torch cut past the corner and then loop back around from the other direction, creating sharper corners in the finished part. Otherwise, outside corners tend to be rounded off somewhat by the torch when it just cuts directly around the corner.

Figure 11:
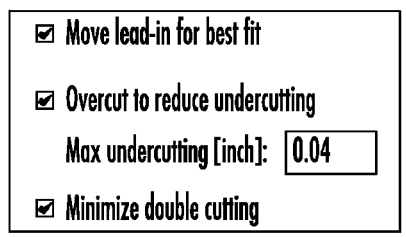
FIG. 11 illustrates a cutting tool selector for an undercutting process.

Referring back to FIG. 8, there is a problem with the $2^{nd}$ one from the left. Undercutting of the original shape results from the offset cut-path. Also, the creation of additional cut-paths means the shape will take longer to cut, wear out the equipment faster, and produce more defects where the torch has to be turned off and on. But because of the kerf width of the cutter, tight areas of the T simply cannot be cut without cutting into areas that are not supposed to be cut. A compromise is needed where this undercutting is reduced at the expense of some overcutting. This is provided with reference to the $3^{rd}$ T from the left. Notice that the 3 cut paths that were created have been joined together into one, and the cut path has extended further down the sharp points of the T without creating messy overlaps. The settings for this new feature are shown in FIG. 11. The settings allow overcutting and limit how much undercutting occurs. When this feature is used, undercutting is how far short a sharp point will be cut from its tip. A method provides this functionality as follows: After the offset is performed (producing the $2^{nd}$ T from the right), the software scans for undercut areas of the original shape. If multiple paths are created from offsetting, stretches between them are automatically classified as undercut areas that need to be connected. If other tips or parts of the basic image line are found that are more than the threshold distance from the cut-paths created, they are also classified as undercut areas needing to be routed.

The software then traces down the geometric center of these undercut areas, since they are too narrow to fit the kerf width of the cutter. The traces are joined to the existing cut-paths and routed in both directions. In other words, when the torch cuts out the shape by following the final cut-path, it will cut down the center of the undercut areas in one direction and then return back along the same path as it continues along in its travels.

Referring still to FIG. 8, the rightmost T shows an additional improvement. The start of the cut-path (the lead-in) has been automatically relocated to a position that minimizes the amount of double cutting that the torch does along the same portion of the cut-path. This double cutting results from centerline tracing. In the case of the $3^{rd}$ T, there are two stretches of double cutting occurring at the top. The $4^{th}$ T has eliminated one of these stretches by repositioning the lead-in at the start of the cut-path at one end of the double cut area. Double cutting is eliminated from that stretch, because the cut-path travels around the rest of the T first, then it goes down the right branch and ends after completing the triangular hole.

Figure 12:
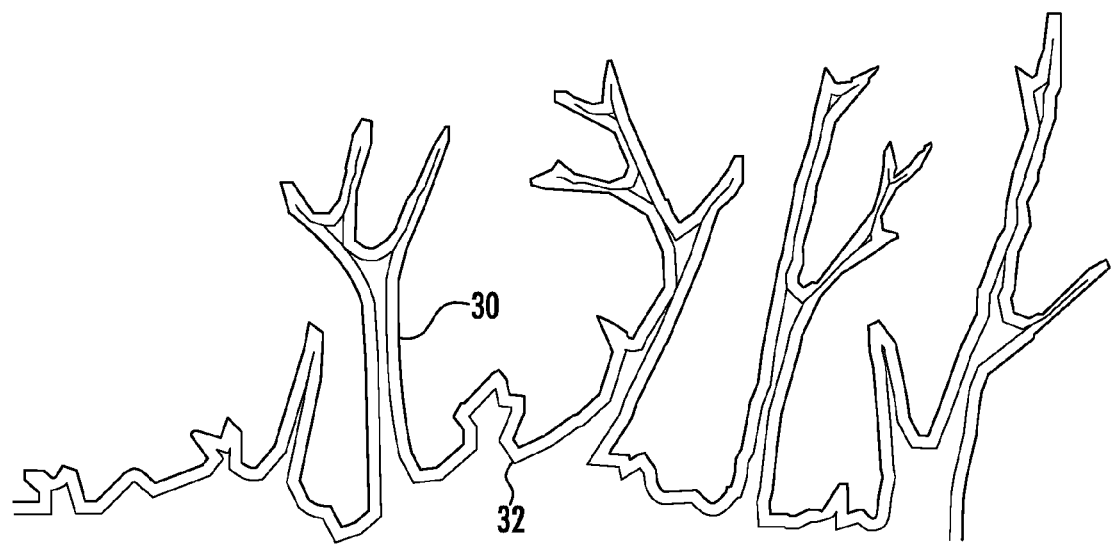
FIGS. 12 and 13 illustrate using the merging image technique to reduce double cutting with relation to adjacent near-parallel cut-paths.

Turning to FIG. 12, an example of a more complex shape 30 that is converted to a cut-path 32 using the method described above. Notice how many branches of the original shape or image are too narrow for the kerf width, yet cut-path 32 as generated still traces down the middle of these branches to give the best possible result when cutting out the shape.

Figure 13:
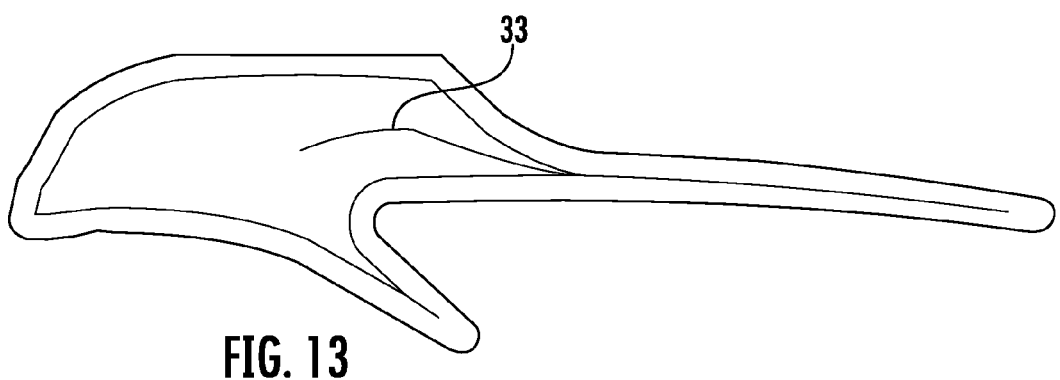

Turning to FIG. 13, another example of a cut-path that is converted for cutting using the option to minimize double cutting is shown. What would have been a long double-cut stretch is only cut once, because the main hole is cut first and then the cut-path ends after it goes down the center of the long branch. Note that the lead-in 33 produced is not straight. Instead, it curves in a shape that follows the geometric center of the original image region. It is essentially a continuation of the trace that follows the center of the section too narrow for the kerf width, but it continues into the open area of the cut-path to provide maximum clearance from the final cut edge. This allows the torch to pierce the metal at the start of the cut and begin the cut in an area that is clear of the final shape, to minimize the risk that the piercing process will damage the final cut shape.

The method for merging paths is also used for automatically placing normal, straight lead-ins on cut-paths. Lead-ins are placed based on where a user designates when converting to cut-paths, but they are also automatically placed in many situations. When this happens, a lead-in must be generated according to the length requested in the settings, but the end of the lead-in can't be closer to any edge of the cut-path than this distance. If inadequate distance is present, the lead-in is shortened so it is centered within the space, and if possible it is relocated along the path so that it starts in the center of the largest open area of the path.

Figure 14:
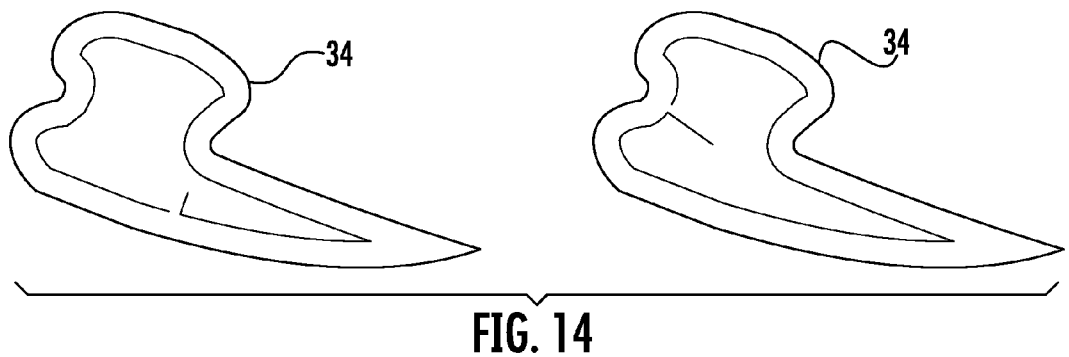
FIG. 14 illustrates using the merging image technique to place lead-ins in different places to enclosed cut-paths.

FIG. 14 is an illustration which shows how this process works when a user designates to add a lead-in at a specific location. If the option to "move lead in for best fit" is not used (left), the lead-in is positioned where a user designates, and the length is adjusted so that the end of the lead-in is positioned in the center of the original closed image shape to be cut. If the option is used (right), the lead-in is moved to the best position that allows it to be the full length or as long as possible if space is limited. This process works by repeatedly trying lead-in positions off segments or corner nodes. Offset regions are generated from original image line 34 (similar to the offset function) and these regions are used to cut away the different possible lead-in locations to see if any valid location remains that is clear of the original image line. If the full-length lead-in cannot be created off of any node or line segment, shorter lengths are tried and then longer if the shorter ones fit, until the lead-in that is very close to the maximum length possible is found and created.

Figure 15:
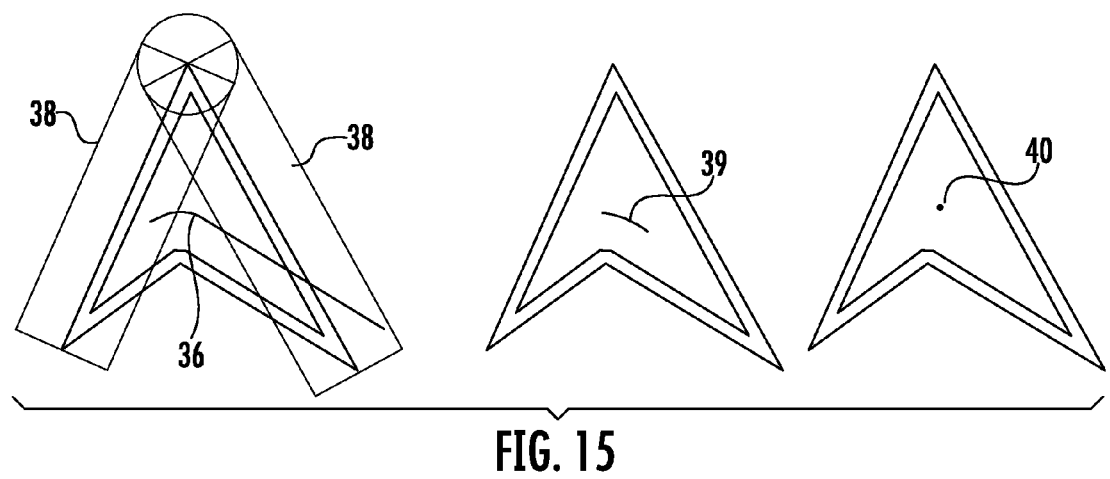
FIGS. 15 and 16 each illustrate several steps in the merging image technique to place lead-ins in different places to different enclosed cut-paths.

FIG. 15 shows how this process works. Starting at the left illustration, arc and line segment 36 are offset from an inside corner and adjacent line segment. They show possible locations for the end of the lead-in. Closed image lines 38 show offset regions from the original path to be cut. These regions are used to cut away (or delete) the possible lead-in locations. The remaining arc and line segment 39 (middle) show viable lead-in locations that can be used for the lead-in length tried. (These paths are not visible to the user but are shown in the illustration because they are used in the method.) This process may continue for different lead-in lengths (and at different segments and corners, if the option to move the lead-in is enabled or if the lead-in location is being selected automatically rather than being picked manually) in order to find the best possible lead-in location. In this example, the software would try a slightly longer lead-in next, and if no valid location remains it would try a length in the middle and so on, until the final valid location range is very small and the lead-in length has been optimized (point 40 on the right).

Figure 16:
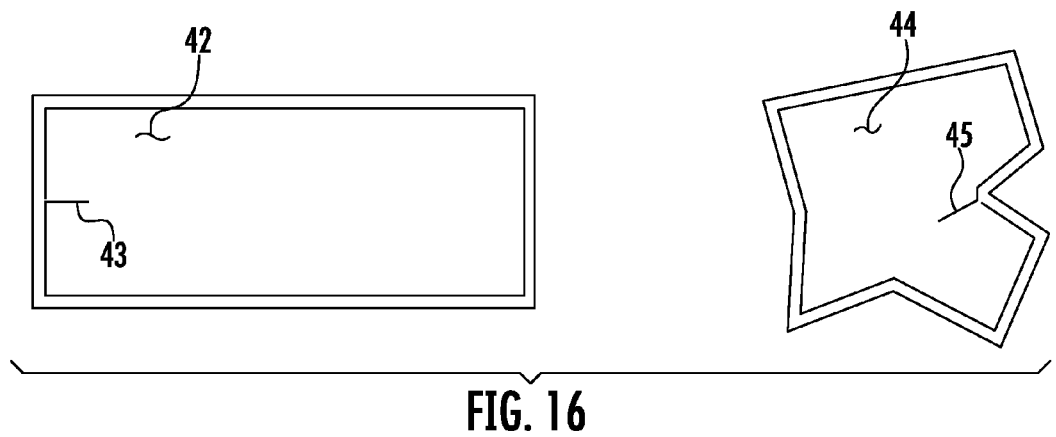

When the lead-ins are automatically located (as opposed to positioning them manually where the user clicks), it also prefers to locate them off the sharpest convex corner, if any. This produces less of a defect in the finished part after it is cut. FIG. 16 illustrates how this works. Hole 42 on the left has no convex corners, so lead-in 43 is placed off one of the straight segments. Hole 44 on the right has convex corners, so lead-in 45 is placed off the sharpest one (provided that room is available for the specified or maximum possible lead-in length).

Figure 17:
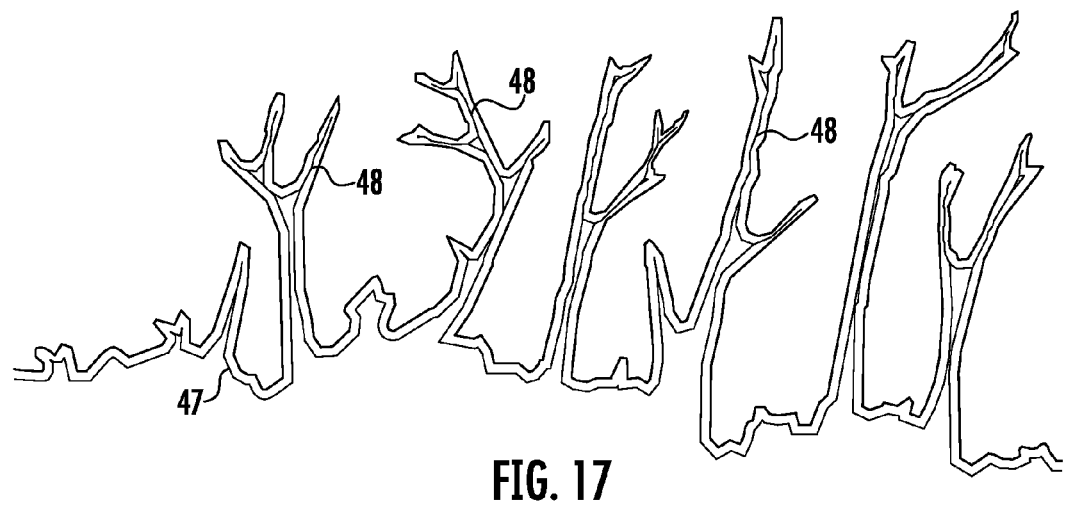
FIG. 17 illustrates areas in a cut-path where the height control for a cutting torch is automatically switched off and/or the cut speed is automatically accelerated.

As discussed, cut-paths often involve areas where the torch must cut back along parts of a path that it has already cut. It is better to keep the torch on when this happens, because turning it off and on again will wear it out faster and also cause more damage to the piece being cut. However, when the torch recuts along the same line, it tends to wear the torch more and make the cut wider than it was originally. Also, if an automatic arc voltage height control is being used, the height control will tend to determine that the torch is higher above the material than it actually is because of the material that is missing directly under the torch. The height control will tend to respond by lowering the torch so that it is too close to the material or even make it hit the material and drag. This further wears the torch, deteriorates the cut quality, and can even ruin the part or damage the machine. To address these problems, the method of the present invention can automatically shut off the height control when the torch is passing back over an area already cut. It can also automatically increase the cut speed in these areas so the torch spends less time recutting the same stretch. This improves the quality of the cut, decreases wear on the torch, and makes the part finish faster. With reference to FIG. 17, a cut preview (a function in the software) shows areas where the height control will automatically switch off and/or the cut speed will automatically be accelerated as the torch passes over areas already cut (indicated by the cut path 47 being a single line as at lines 48).

Note that the torch originally travels down the path at normal speed with the height control active, but when it traces back the other way the speed increases and/or the height control is disabled. These new features use the new image merging method to find areas of a cut-path that are inside of areas previously cut by the same or previous cut-paths. As with the offset command, rectangular and circular regions are created around segments and corners of a cut-path, based on some multiple of the kerf width. (A larger multiple is used for turning off the height control than for accelerating the speed.) The software scans areas of the cut-path that follow each region to see if any reenter the region. If so, they are marked (rather than being rerouted or cut) at the points where the line enters and leaves the region. Then all the marks are organized to eliminate short pieces so that what remains are the main stretches where the speed will be accelerated and/or the height control will be disabled. (Note that these are both done separately and don't necessarily coincide with each other.) The height control can also be disabled when the cut speed slows a certain threshold below the normal speed, such as 80%. Otherwise, the same sort of problem (where the torch is lowered too much because of a lack of material being sensed under it via arc voltage) can happen with the height control when the cutting speed slows down too much because of a lot of sharp corners and direction changes.

Figure 18:
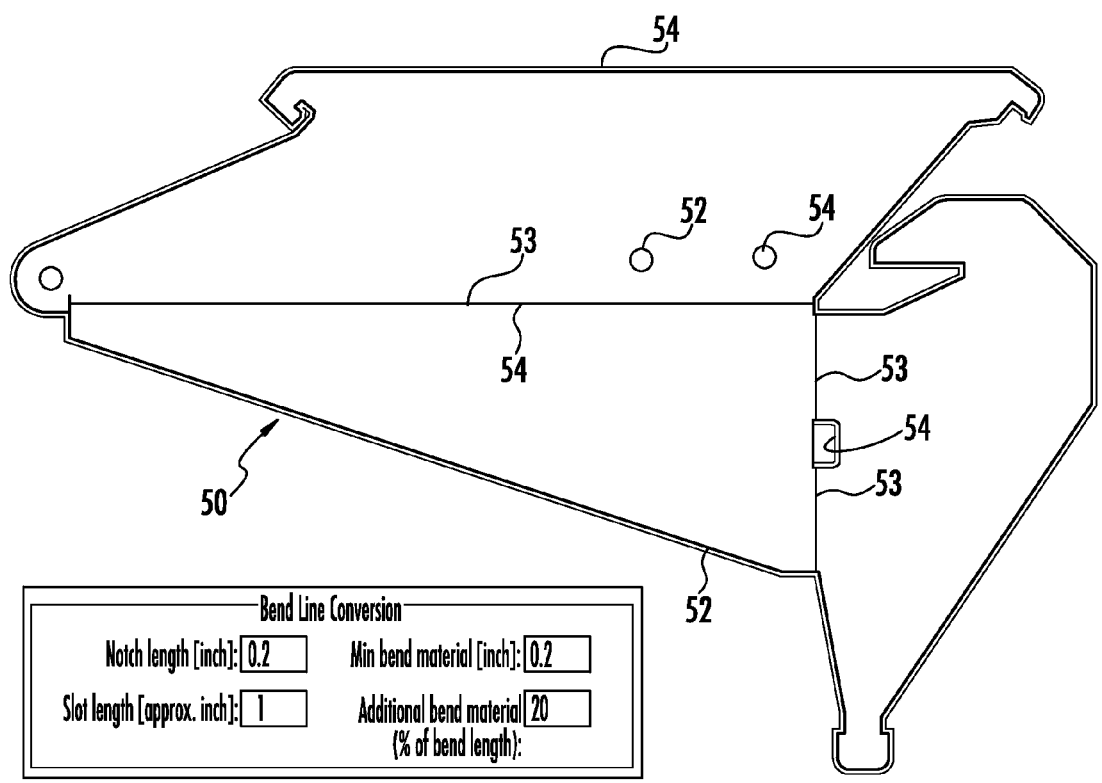
FIG. 18 illustrates automatic sensing and processing of bend lines in an enclosed cut-path and a cutting tool selector for the sensing process.

Referring to FIG. 18, bend line conversions can also be provided. The software can now automatically sense and process the existence of bend lines in parts when converting them to cut-paths. Two options are available for cuts made on bend lines: Small notches can be cut along the ends of bend lines as part of the regular cut-paths. These help with the bending process because they allow the notches to be lined up to the brake when the part is bent, so the bend lines do not have to be measured and laid out. Also, perforated lines can be cut along the inside of bend lines to make parts easy to bend with minimal tools. For example, a part can often be cut this way and then simply bent by hand. A part 50 consists of closed paths 52 defining the perimeter and holes, and four open path lines 53 defining the bend lines. The cut-paths generated are designated 54.

The settings shown in FIG. 18 were used when the part was converted. Notice that a 0.2-inch-long notch is cut into each bend line from the ends. Also, perforated slots are cut along the longer bends. (The short bend does not have enough material to have slots cut into it.) Note that the option to put notches at the ends of bends or slots along the inside of bends can be used independently of each other.

Figure 19:
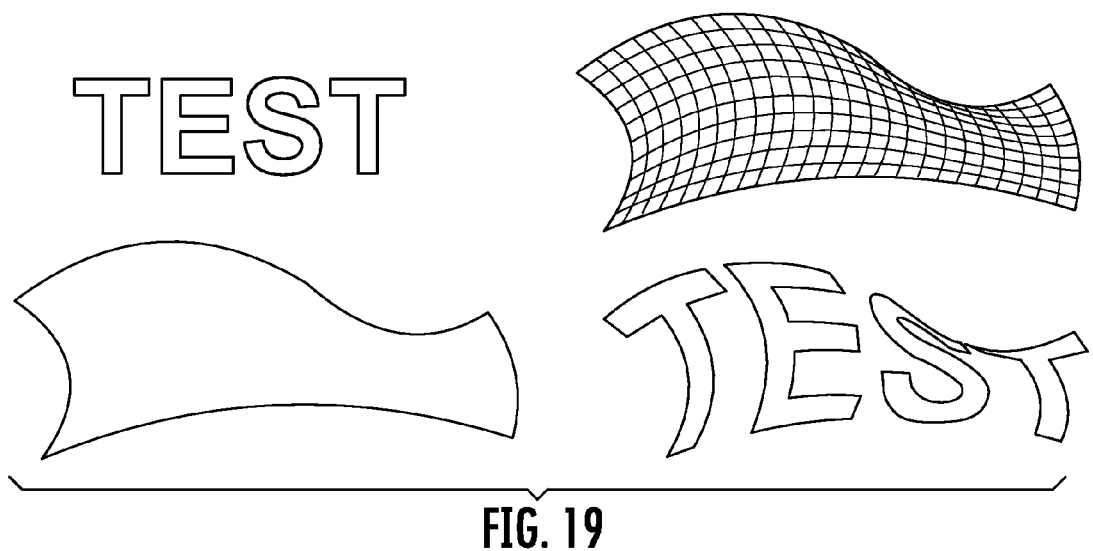
FIG. 19 illustrates several steps in a process for fitting selected image lines in a closed cut-path.

The method also fits selected images to a closed image. This is commonly used for letters, but it can be used for any drawn objects. FIG. 19 shows an example of how a specific image or pattern is fit to a selected closed image. In this example the word TEST is fit to the irregular closed image shown. First, the software scans the image lines to be fit to identify a bounding rectangle that just contains all of them. This rectangle is to be fit to the irregular closed image. Next the software scans the irregular closed image to find its 4 sharpest corners. (These will be aligned to the bounding rectangle mentioned.) Then the software constructs a grid pattern across the irregular closed image, between these corners. Finally, the image lines to be fit are moved into interpolated positions within the grid based on their locations within their original bounding rectangle. This requires adding nodes to straight segments of the original images so they can be curved around the grid. The grid is not visible to the user but is shown here for illustration purposes. The grid is made finer or courser, depending on the allowable margin of error specified by the user. The grid is mathematically formed differently over the irregular image line depending on which of 4 options is selected by the user when the command is used.

Figure 20:
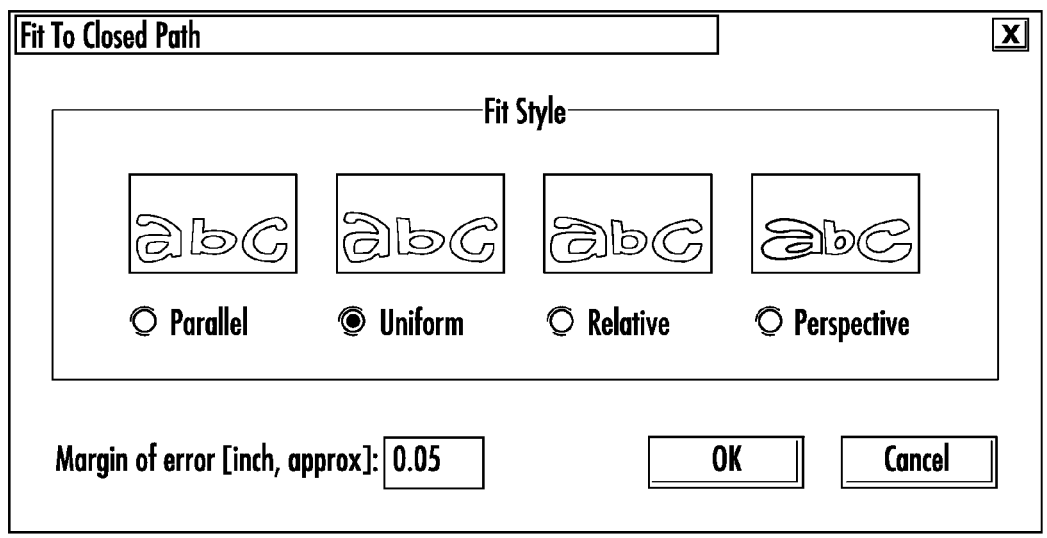
FIG. 20 illustrates a selector for the process of FIG. 19.
Figure 21:
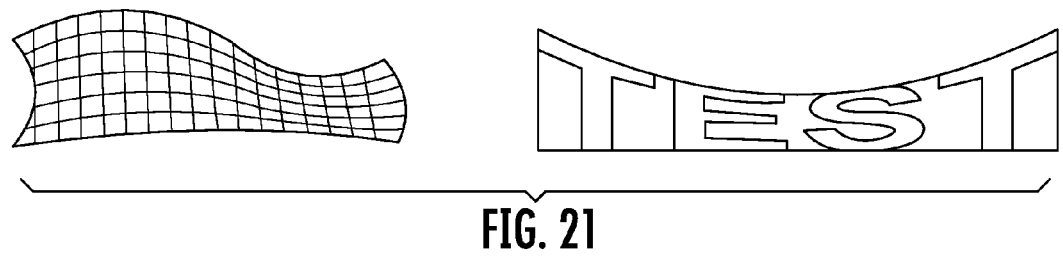
FIGS. 21, 22, and 23 illustrate steps in the process for fitting selected image lines in a closed cut-path in other examples.

The four options are illustrated for selection in FIG. 20. The parallel option simply constructs straight image lines with ends evenly spaced (only in the horizontal direction) along the top and bottom of the shape for the vertical part of the grid. The horizontal part of the grid is constructed from one side to the other, evenly spaced on each vertical gridline. An example is shown by the left most illustration in FIG. 20. This option helps to keep vertical components parallel when the shape is distorted as in the example shown by the right most illustration. The other three options start with a grid with ends evenly spaced along the 4 sides of the original shape. Then each point inside the grid it is repeatedly shifted horizontally and vertically in proportion to the vertical and horizontal spacing of the grid. So for example, the lengths of all the vertical gridlines will be calculated, and these lengths will be used to adjust the horizontal positions of the gridline intersections by shifting them right or left along the horizontal gridlines. Then the lengths of all the horizontal gridlines will be calculated, and these lengths will be used to adjust the vertical positions of gridline intersections by shifting them up or down along the vertical gridlines. This process repeats until continuing position changes are well within the allowed margin of error.

Figure 22:
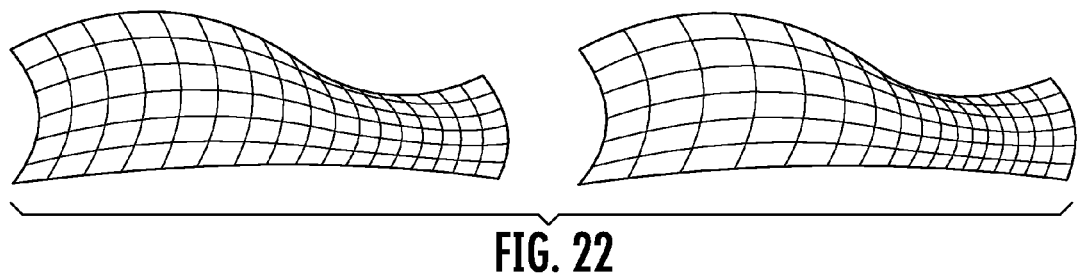

The uniform option keeps the length of every segment across any specific vertical or horizontal gridline the same (FIG. 19). The relative option (FIG. 22 left) adjusts the length of each segment to be in proportion to the overall length of each intersecting gridline. The perspective option (FIG. 22 right) adjusts the length of each segment to be in proportion to the square of the overall length of each intersecting gridline.

Figure 23:
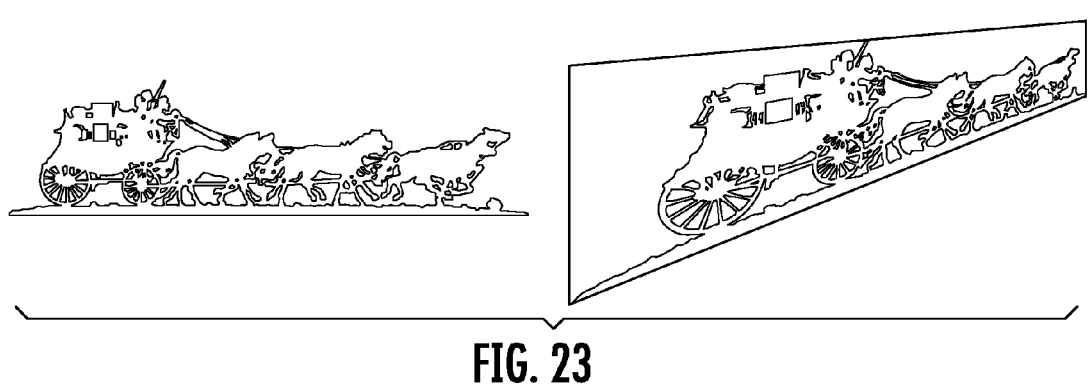

Referring to FIG. 23, the perspective option provides a perspective view when used on a polygon with straight sides, as Shown.

Figure 24:
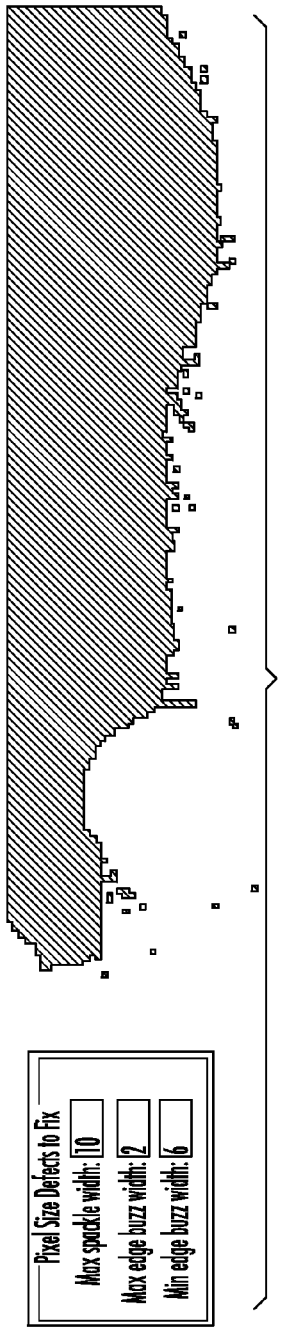
FIG. 24 illustrates a process of converting raster images to vectors with edge fuzz removal and a selector for the process.

A method for converting raster images to vectors is also provided. Now the software can automatically shave off fuzz from the edge of images converted. Referring to FIG. 24, an example is shown of settings used and the result when applied to an imported image. The software first converts the image to vectors by tracing around all the connected black pixels. Then it removes fuzz in places where a shape sticks out that is equal to or narrower than the fuzz width setting and equal to or longer than the fuzz length setting. In such cases, the protrusion is simply cut off the shape of the vector, as shown. Another improvement was made for converting raster images into 3D paths. This feature creates a cut path that weaves across the surface of the image with its height varying according to how light or dark each pixel is. It is suitable for using a router to cut a 3D relief from wood or other material. Settings are available for changing the resolution of this pattern, the thickness of the design to be cut, and for compensating for the shape of the cutting tool. Tool shape compensation means that the final shape cut by the tool will be as similar as possible to the original design, not necessarily the cut-path. The cut-path will be created with such a profile that the actual shape cut by the tool following the profile does not overcut the shape (It works similarly to kerf compensation for 2D cutting.)

Figure 25:
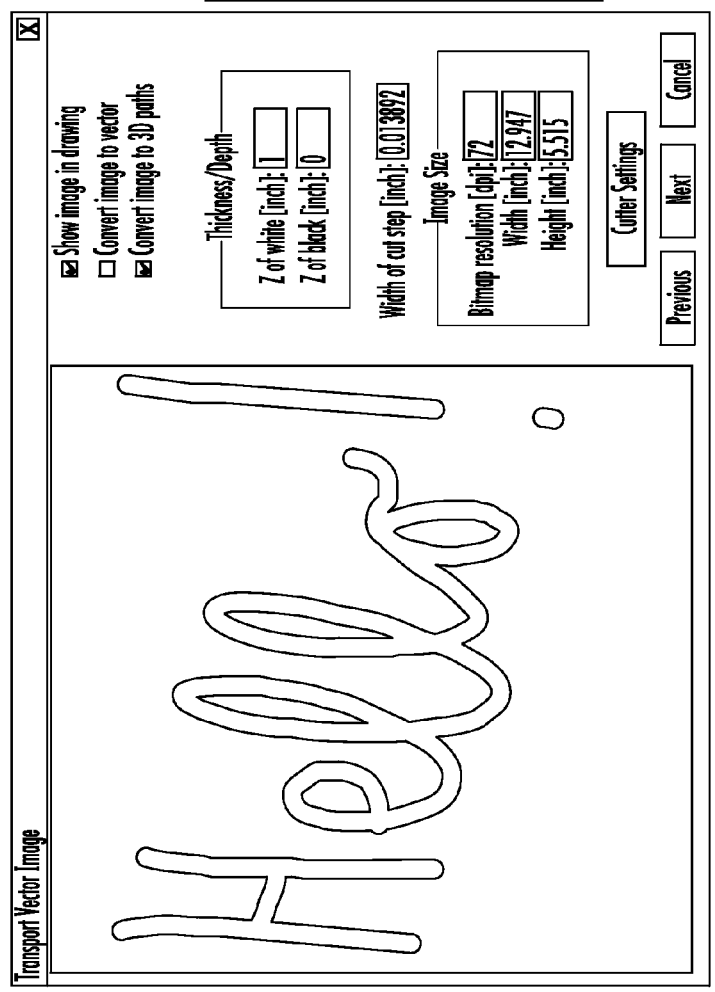
FIGS. 25 and 26 illustrate a process of converting raster images to 3-dimensional cut paths and a selector for the process.
Figure 26:
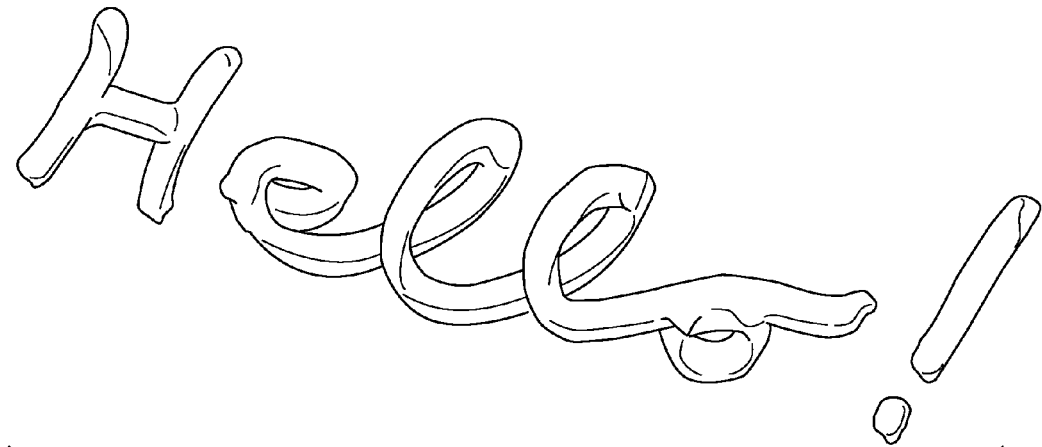

Turning to FIGS. 25 and 26, an image is imported and the resulting 3D shape of the cut-path is determined. This uses an additional option that automatically omits cut-paths from the top most layer of the raster image. This is useful for reducing the time required to cut the shape, as in the case shown.

Figure 27:
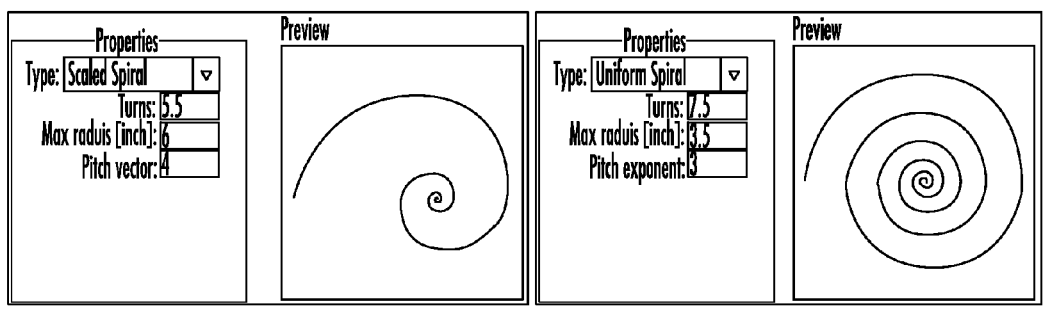
FIGS. 27-31 illustrate a variety of automatic shape images and a selector for each shape.

A new automatic shape drawing feature provides several built-in shapes that can be selected and drawn. Some of these shapes are mathematically unique and are described below. Turning to FIG. 27, the scaled spiral (left) is driven by an equation where the radius is proportional to the pitch scale raised to the power of the number of turns. So when the pitch scale is 4, for example, the radius is 4 times as large as the previous radius each time you go around the spiral another turn. The uniform spiral (right) is driven by an equation where the radius is proportional to the number of turns raised to the power of the pitch exponent. So when the pitch exponent is 3, for example, the radius is 8 times as large at the second turn than at the first turn.

Figure 28:
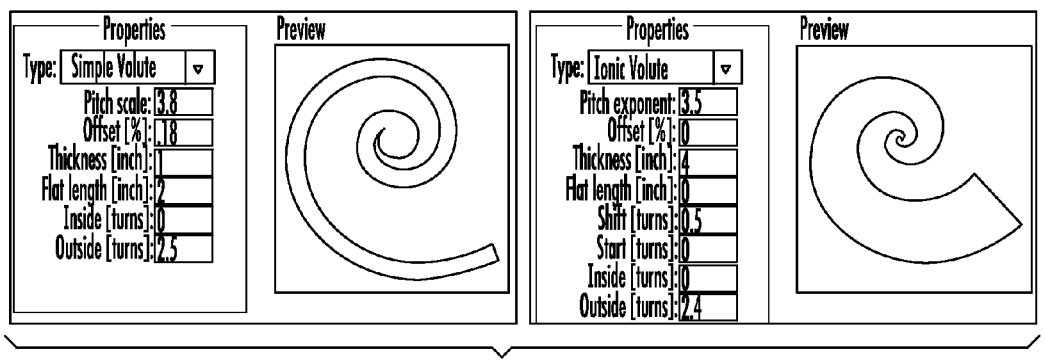

Turning to FIG. 28, the simple volute scroll (left) is driven by the same equation as the scaled spiral. The inside and outside edges of the scroll are offset from the base spiral according to the settings. The ionic volute scroll (right) is driven by the same equation as the uniform spiral. The outside edge of the scroll is offset from the base spiral, and the inside edge is a copy of the outside edge that is rotated by a shift setting. The inside edge is offset to align its start to the start of the outside edge, according to a start turns setting. Note that in spite of their names, the simple and ionic volute shapes are not derived using the classic geometric method, which typically consists of quarter-circle arcs. Instead, they are generated from the spiral equations described.

Figure 29:
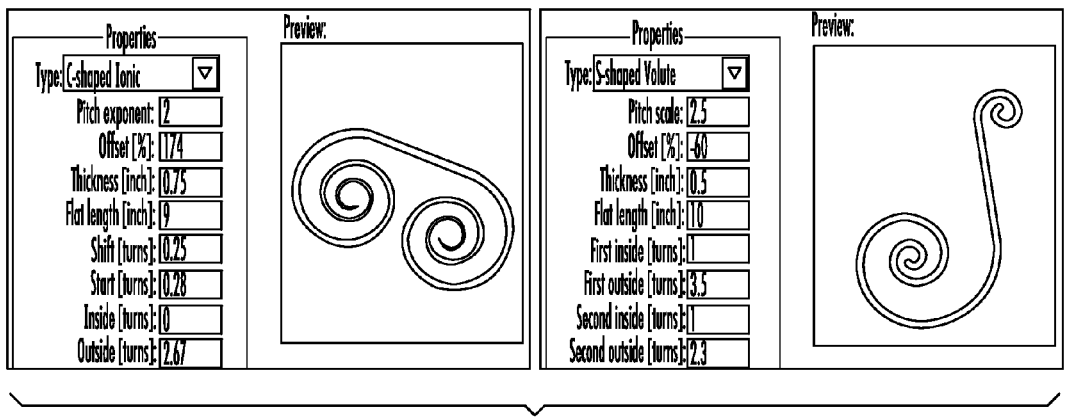

Turning to FIG. 29, the software also provides the ability to draw double-ended scrolls.

Figure 30:
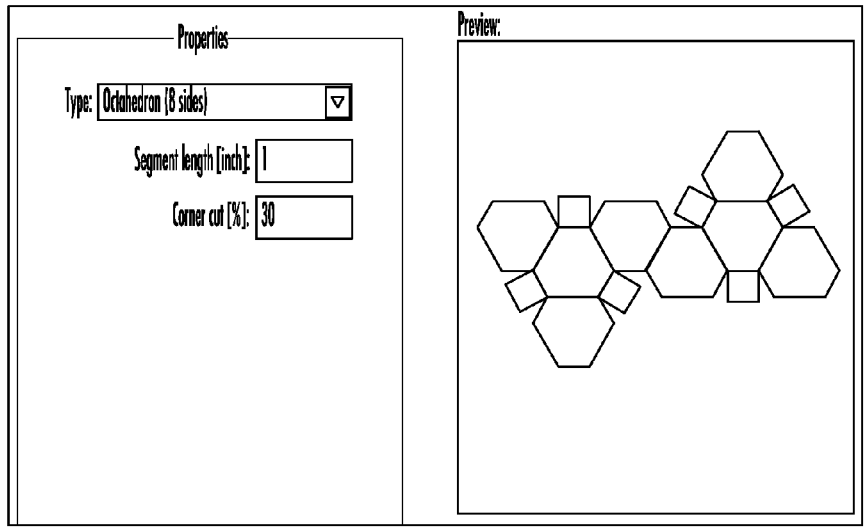

Turning to FIG. 30, the software has a shape function that draws any of five regular polyhedra (with 4, 6, 8, 12 or 20 sides) laid out in a flat pattern that can be bent up to form the 3D solids. A unique aspect of this feature is that the corners can be cut by varying amounts, providing nearly an infinite number of possible 3D solid shapes. In the example shown, the octahedron has corners cut to 30%. This generates a semi-regular shape with 14 sides instead of 8, where the length of each square side is 30% the combined length of the two types of sides. Using this process, the 6-sided polyhedron cut to 100% creates the same shape as the 8-sided polyhedron cut to 100%, and the 12-sided polyhedron cut to 100% creates the same shape as the 20-sided polyhedron cut to 100%.

Figure 31:
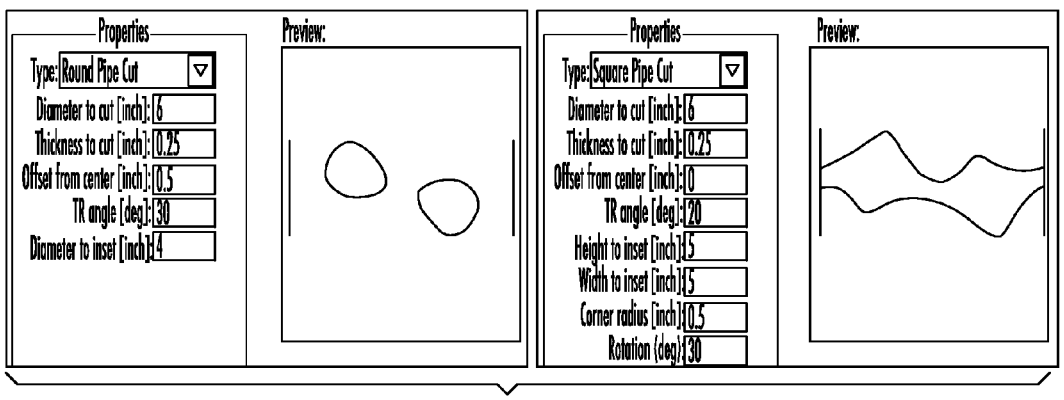

Turning to FIG. 31, the software has a pipe cutting shape function that creates the shape that must be cut out of a round pipe in order for another round or rectangular tube to pass through it. The shape of the pipe cut is rolled out flat and can be cut out of a flat piece of metal that is then rolled into a pipe. The shape can also be cut directly out of the pipe using a specialized pipe cutting attachment. The function provides options for specifying the size and thickness of the pipe to be cut, as well as the shape of the round pipe or rectangular tube that will pass through it. The pipes can be angled, rotated, and shifted from each other using the settings. The function computes the final shape that needs to be cut from the pipe to clear the other tube, taking into account the thickness as well. (More material must be cut away from the pipe if it has thickness for the tube that passes through it to have clearance, particularly when they are angled.) The function works by projecting different points of the tube's surface onto the surface of the pipe to be cut using 3D geometry. Profiles are created for both the outside and inside of a pipe with thickness, and the final shape to be cut is determined by combining the areas of these two profiles (merged paths process). The function also has an option to pass the tube through a flat plate rather than a round pipe. The process is basically the same as for a round pipe and can be thought of as passing a tube through only one side of a pipe of infinite diameter.

Figure 32:
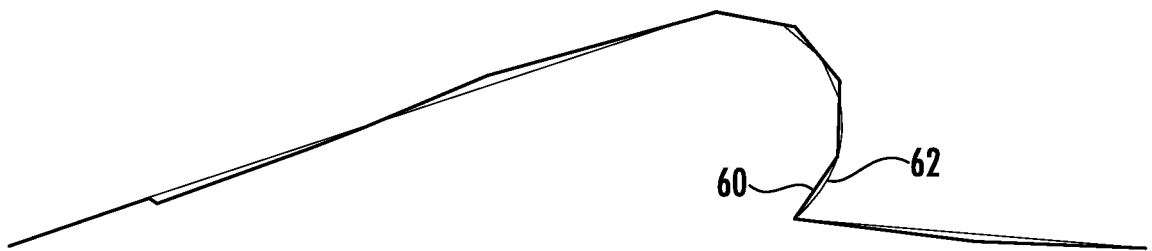
FIG. 32 illustrates a smoothing function for scanning images including several nodes.

With reference to FIG. 32, also provided is a smoothing function which scans a path composed of several nodes. It tries fitting arcs or lines across a span of nodes to see how well nodes between the span fit the line or arc. Scores are created depending on the accumulated errors in position between the original nodes and the new shapes. It continues this process, trying many different combinations of node spans and keeping the ones with the best scores that are also within the margin of error. FIG. 32 shows an example of a path 60 before and a path 62 after this smoothing process.

Various changes and modifications to the embodiment herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

The invention claimed is:

1. A method of forming a cut path comprising the steps of: selecting a first image line; selecting a second closed image line surrounding an enclosed area; overlying the second closed image line on the first image line and identifying intersections between the first image line and the second closed image line; and adding portions of the second closed image line lying between the intersections with portions of the first image line to form a cut-path including a continuous combination of at least a portion of the second closed image line and portions of the first image line;

the step of selecting the second closed image line includes selecting a plurality of rectangular polygons, each rectangular polygon of the plurality of rectangular polygons having a width that is twice a selected or desired offset distance;

the step of overlying the second closed image line includes overlying and centering a rectangular polygon of the plurality of rectangular polygons with each continuously straight segment of the first image line and identifying intersections between the first image line and each of the plurality of rectangular polygons;

the method further including the step of providing a program writing the images into a cut-path; and the step of adding portions includes instructing the program to turn one of right or left at each of the intersections between the plurality of rectangular polygons and the first image line to form the cut-path offset the selected or desired offset distance.

2. The method claimed in claim 1 wherein the offset cut-path includes multiple cut-paths with undercut areas between the at least two cut-paths of the multiple cut-paths created from the offsetting: the method further including the steps of the writing program tracing along a geometric center of the undercut areas, and joining the traces to the existing multiple cut-paths and routing the traces in one direction and returning back along the same path.

3. The method of claim 1 further including:

selecting a plurality of rectangular polygons, each rectangular polygon of the plurality of rectangular polygons having a width based on a kerf width;

subsequent to the step of adding portions to form the cut-path, overlying and centering a rectangular polygon of the plurality of rectangular polygons with each continuously straight segment of the cut-path and identifying intersections between the cut-path and each of the plurality of rectangular polygons including an entrance intersection at which the cut-path enters the rectangular polygon and an exit intersection at which the cut-path exits the rectangular polygon;

providing a program for writing the images into the cut-path, providing a torch for the cutting tool and a cutting program using a height control and a speed control for the torch movement;

instructing the writing program to determine any rectangular polygon of the plurality of rectangular polygons in which the cut-path reenters and leaves, marking at the entrance intersections and exit intersections where the cut-path reenters and leaves the rectangular polygon; and instructing the cutting program to accelerate the speed and/or disable the height control of the torch in the marked rectangular polygons.

4. The method claimed in claim 1 wherein the step of overlying and identifying intersections includes identifying pairs of intersections with each pair including an entrance intersection at which the first image line enters the enclosed area surrounded by the second closed image line and an exit intersection at which the first image line exits the enclosed area surrounded by the second closed image line.

5. The method claimed in claim 4 wherein the step of adding portions of the second closed image line includes making a determination to turn one of right or left at both of the intersections of a pair of intersections.

6. The method claimed in claim 4 wherein the step of overlying and identifying intersections includes identifying a plurality of pairs of intersections and the step of adding portions of the second closed image line includes making a determination to turn in the same direction at all of the intersections of the plurality of pairs of intersections.

7. The method claimed in claim 1 wherein the step of selecting the first image line includes selecting a portion of an image line with a first end and a second end and a straight line segment extending from the first end to the second end, the step of selecting the second closed image line includes selecting a rectangular polygon with a width twice a selected or desired offset distance and the length at least equal to the length of the straight line segment between the first end and the second end, the step of overlying includes centering the rectangular polygon on the straight line segment to form intersections at the first end and the second end, and the step of adding includes making a determination to turn one of right or left at both of the intersections depending on a selected or desired offset direction.

8. The method claimed in claim 7 wherein the step of selecting the first image line includes selecting an image line with a sharp corner, and the step of selecting the second closed image line includes selecting a circle image with a radii equal to a selected or desired offset distance, the step of overlying includes centering the circle image on the sharp corner, and the step of adding includes adding a portion of the circle image to an adjacent or underlying rectangular polygon to define a fillet at the sharp corner.

9. The method claimed in claim 7 wherein the step of selecting the first image line includes selecting an image line with a sharp corner, and the step of selecting the second closed image line includes selecting a rectangle before the corner that has an additional node forming a symmetric chamfer off the sharp corner, the distance from the middle of the chamfer to the original corner being equal to the offset distance.

10. The method claimed in claim 1 wherein the step of selecting the first image line includes selecting an image line with an interior disconnected portion, and the step of selecting the second closed image line includes selecting a rectangular polygon positioned to overlie at least a portion of the interior disconnected portion, and the step of adding combining stenciling to the first image line to form a cut-path that can be cut without any holes falling away.

11. The method claimed in claim 1 further including a step of designating a lead-in to the cut-path.

12. The method claimed in claim 11 wherein the step of designating the lead-in to the cut-path includes designating a length for the lead-in.

13. The method claimed in claim 12 where, in the step of designating the length for the lead-in, if inadequate distance is present within an enclosed space in the cut-path, the step includes automatically shortening the lead-in so it is centered within the space.

14. The method claimed in claim 13 wherein the step including automatically shortening the lead-in so it is centered within the space also includes automatically relocating the lead-in along the path so that the lead-in starts in the center of a largest open area of the cut-path.

15. The method claimed in claim 1 wherein a cutting program using a height control and a torch for the cutting tool is included and the method further including a step of one of automatically shutting off the height control or increasing the cutting speed when the torch is passing back over an area already cut.

16. The method claimed in claim 1 further including a step of providing software to perform the adding step, the software sensing and processing the existence of bend lines during the formation of the cut-path, and the software adding cut-notches along ends of bend lines as part of the cut-path and/or adding perforated lines along the inside of bend lines.

17. A method of forming a cut path comprising the steps of:
selecting a first image line;
selecting a second closed image line surrounding an enclosed area;
overlying the second closed image line on the first image line and identifying a pair of intersections between the first image line and the second closed image line; and
making a determination to turn one of right or left at both of the intersections of the pair of intersections to add portions of the second closed image line lying between the intersections with portions of the first image line to form a cut-path;
wherein the step of selecting the first image line includes selecting a portion of an imam line with a first end and a second end and a straight line segment extending from the first end to the second end, the step of selecting the second closed image line includes selecting a rectangular polygon with a width twice a selected or desired offset distance and the length at least equal to the length of the straight line segment between the first end and the second end, the step of overlying includes centering the rectangular polygon on the straight line segment to form intersections at the first end and the second end, and the step of adding includes making a determination to turn one of right or left at both of the intersections depending on a selected or desired offset direction.

18. The method claimed in claim 17 wherein the step of overlying and identifying intersections includes identifying a plurality of pairs of intersections and the step of adding portions of the second closed image line includes making a determination to turn in the same direction at all of the intersections of the plurality of pairs of intersections.

19. A method of forming a cut path comprising the steps of:
selecting a first image line;
selecting a second closed image line surrounding an enclosed area;
overlying the second closed image line on the first image line and identifying a pair of intersections between the first image line and the second closed image line with the pair including an entrance intersection at which the first image line enters the enclosed area surrounded by the second closed image line and an exit intersection at which the first image line exits the enclosed area surrounded by the second closed image line; and
making a determination to turn one of right or left at both of the intersections of the pair of intersections to add portions of the second closed image line lying between the intersections with portions of the first image line to form a cut-path;
wherein the step of selecting the first image line includes selecting a portion of an image line with a first end and a second end and a straight line segment extending from the first end to the second end, the step of selecting the second closed image line includes selecting a rectangular polygon with a width twice a selected or desired offset distance and the length at least equal to the length of the straight line segment between the first end and the second end, the step of overlying includes centering the rectangular polygon on the straight line segment to form intersections at the first end and the second end, and the step of adding includes making a determination to turn one of right or left at both of the intersections depending on a selected or desired offset direction.

20. The method claimed in claim 19 wherein the step of overlying and identifying intersections includes identifying a plurality of pairs of intersections and the step of adding portions of the second closed image line includes making a determination to turn in the same direction at all of the intersections of the plurality of pairs of intersections.

21. The method claimed in claim 19 wherein the step of selecting the first image line includes selecting an image line with a sharp corner, and the step of selecting the second closed image line includes selecting a circle image with a radii equal to a selected or desired offset distance, the step of overlying includes centering the circle image on the sharp corner, and the step of adding includes adding a portion of the circle image to an adjacent or underlying rectangular polygon to define a fillet at the sharp corner.

22. The method claimed in claim 19 wherein the step of selecting the first image line includes selecting an image line with a sharp corner, and the step of selecting the second closed image line includes selecting a rectangle before the corner that has an additional node forming a symmetric chamfer off the sharp corner, the distance from the middle of the chamfer to the original corner being equal to the offset distance.

23. The method claimed in claim 19 wherein the step of selecting the first image line includes selecting an image line with an interior disconnected portion, and the step of selecting the second closed image line includes selecting a rectangular polygon positioned to overlie at least a portion of the interior disconnected portion, and the step of adding combining stenciling to the first image line to form a cut-path that can be cut without any holes falling away.

\* \* \* \* \*